United States Patent
Courtney et al.

(10) Patent No.: US 10,318,998 B2
(45) Date of Patent: Jun. 11, 2019

(54) METHOD AND DEVICE FOR SEAMLESS CHARITABLE EXCHANGE OF PRODUCTS AND SERVICES

(71) Applicants: Mark Eliot Courtney, Austin, TX (US); Elizabeth Ann Deering, Austin, TX (US)

(72) Inventors: Mark Eliot Courtney, Austin, TX (US); Elizabeth Ann Deering, Austin, TX (US)

( * ) Notice: Subject to any disclaimer, the term of this patent is extended or adjusted under 35 U.S.C. 154(b) by 1098 days.

(21) Appl. No.: 14/452,094

(22) Filed: Aug. 5, 2014

(65) Prior Publication Data

US 2015/0051995 A1    Feb. 19, 2015

Related U.S. Application Data

(60) Provisional application No. 61/865,959, filed on Aug. 14, 2013.

(51) Int. Cl.
*G06Q 30/00*    (2012.01)
*G06Q 30/02*    (2012.01)
*G06Q 30/06*    (2012.01)

(52) U.S. Cl.
CPC ..... *G06Q 30/0279* (2013.01); *G06Q 30/0601* (2013.01)

(58) Field of Classification Search
CPC .............. G06Q 30/0279; G06Q 30/0601
See application file for complete search history.

(56) References Cited

U.S. PATENT DOCUMENTS

| | | | |
|---|---|---|---|
| 2006/0122926 A1* | 6/2006 | Hsu | G06Q 20/10 705/35 |
| 2012/0143674 A1 | 6/2012 | Ziskrout et al. | |
| 2013/0138543 A1 | 5/2013 | McMaster et al. | |
| 2013/0311326 A1* | 11/2013 | Lucas | G06Q 30/06 705/26.8 |

OTHER PUBLICATIONS

Schwiderski-Grosche, Scarlet, and Heiko Knospe. "Secure mobile commerce." Electronics & Communication Engineering Journal 14.5 (2002): 228-238. (Year: 2002).*

* cited by examiner

*Primary Examiner* — Matthew E Zimmerman
(74) *Attorney, Agent, or Firm* — The Law Firm of H. Dale Langley, Jr., P.C.

(57) ABSTRACT

A method of selling a product for charity in a communications network includes providing a website communicatively connected to the communications network, receiving an offer of the product for discount from a seller device, via the website over the communications network, receiving a request for the product from a charitable device, via the website over the communications network, receiving a purchase order for the product from a contributor device, via the website over the communications network, transacting purchase of the product for discount by the contributor device, via the website over the communications network, and scheduling supply of the product of the step of transacting purchase to the charitable device, via the website over the communications network.

18 Claims, 12 Drawing Sheets

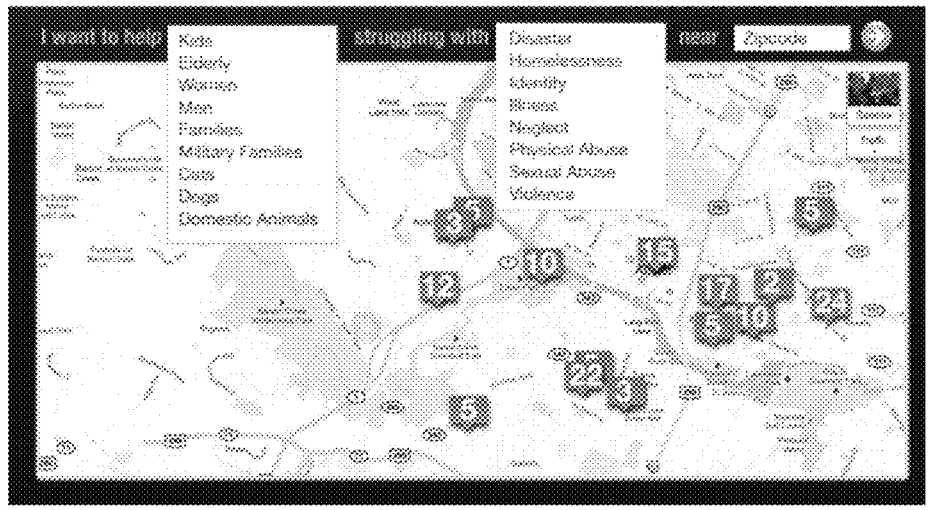

Fig. 5

| Filum | Sector/Faction | X – Life Entity | Z – Area | Y -Life State | | |
|---|---|---|---|---|---|---|
| | | Life Entity Class | Zip code or Geographic Location | 'Needing/In Need of' State | 'Dealing 'or 'Suffering' or 'Struggling With/From' State | 'Recovering From' |
| Humane | Human | Children | | Food | Disaster | Military Duty |
| | | Infants | | Shelter | Homelessness | |
| | | Elderly | | Training | Identity | |
| | | Teens | | Clothing | Illness | |
| | | Families | | Toys | Physical Abuse | |
| | | Men | | Appliances | Sexual Abuse | |
| | | Women | | Books | Violence | |
| | | Military | | Electronics | Family Member in Military | |
| | | Farmers | | | | |
| | | | | | | |
| | Domestic Animals | Dogs | | Building Supplies | In Refuge | |
| | | Cats | | Farming Supplies | Drought | |
| | Wild Animals | Whales | | | | |
| | | | | | | |
| | | | | | | |

Fig. 6

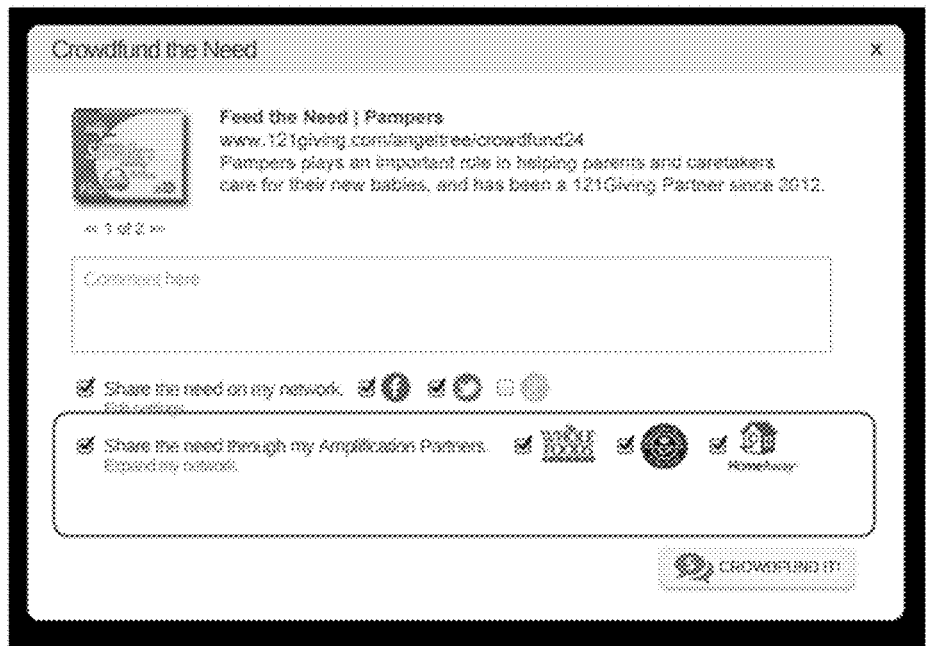
Fig. 10

METHOD AND DEVICE FOR SEAMLESS CHARITABLE EXCHANGE OF PRODUCTS AND SERVICES

CROSS-REFERENCE TO RELATED APPLICATIONS

The present application is a conversion and has benefit of priority of U.S. Provisional Patent Application No. 61/865,959, titled "Systems and Methods for Sale and Liquidation of Products and Services," filed Aug. 14, 2013, which prior patent application has at least one same inventor of the present application.

TECHNICAL FIELD

The invention generally relates to selling or liquidating products and services via communications devices of a communication network, and more particularly relates to a charitable marketplace exchange operable over the Internet to match product and services to needs, while preserving brand and market value.

BACKGROUND

Conventionally, sale and liquidation of overstock, slow-moving, discontinued or retail products or services can negatively impact the seller, including, for example, these sales can negatively impact brand value of the seller and its other products and services, can negatively impact brand and retail value of the sold or liquidated product or service where these same products or services are also made available for sale to general consumer markets at retail price, and/or can negatively impact profitability of third party suppliers or manufacturers of the products or services if all or portions of the products or services, or components, are sourced from those suppliers or manufacturers by the seller.

It would be an improvement to provide hybrid retail and donation systems and methods operable through communications devices communicating over a communications network of a charitable network, for selling slow-moving, liquidated and/or select products or services. It would further be an improvement to provide systems and methods for selling or liquidating products or services at discount, to maintain price and brand of products and services in other markets. It would also be an improvement to make these systems and methods available for the benefit of charitable units, for example, charitable and not-for-profit organizations.

SUMMARY

An embodiment of the invention is a method of selling and liquidating products for charitable gift giving. The method includes providing a web site of a web server computer, providing a database communicatively connected to the server computer, receiving by the server computer a request for the web site, from a browser of a charity communications device communicatively connected to the server computer, serving the website by the server computer to the charity communications device, receiving via the website by the server computer, a need request from the charity communications device, creating by the server computer a virtual account for the need request, saving by the server computer the need request in the database, receiving by the server computer a request for the web site, from a public communications device communicatively connected to the server computer, serving the website by the server computer to the public communications device, determining by the server computer a geographic location of the public communications device, transmitting by the server computer to the public communications device, a map display in the website, the map display in the website includes an identifier of the charity communications device, receiving via the website by the server computer, a money donation related to the identifier from the public communications device, and saving by the server computer a credit in amount of the donation in the virtual account.

Another embodiment of the invention is a method of selling and liquidating products for charitable gift giving. The method includes providing a web site of a web server computer, providing a database communicatively connected to the server computer, receiving by the server computer a request for the web site, from a seller communications device communicatively connected to the server computer, serving the website by the server computer to the seller communications device, receiving via the website by the server computer, an offer from the seller communications device, creating by the server computer a virtual account of credits for a charity communications device, receiving by the server computer a purchase request from the charity communications device, the purchase request matches the offer, and transacting by the server computer purchase by the charity communications device and sale by the seller communications device pursuant to the offer, in return for the credits of the virtual account.

Yet another embodiment of the invention is a method of selling and liquidating products for charitable gift giving. The method includes providing a web site of a web server computer, the web site includes at least one product for sale, providing a database communicatively connected to the server computer, establishing a virtual account for a charity communication device communicatively connected to the server computer, crediting a donation received in respect of the charity communication device from at least one public device communicatively connected to the server computer, accumulating the credit in the virtual account for purchase of any of the at least one product by the charity communication device, searching the web site by the charity communication device for a select product of the at least one product, selecting the select product by the charity communication device in the web site, and transacting purchase of the select product with the credit, by the charity communication device in the web site.

Another embodiment of the invention is a device for electronically selling and liquidating products for charitable gift giving including memory containing a set of instructions and a processor for processing the set of instructions. The set of instructions include instructions for receiving a request for a website from a browser of a charity communications device, serving the website responsive to the request of the charity communications device, receiving a need request via the website from the charity communications device, creating a virtual account for the need request, receiving another request for the website from a public communications device, serving the website responsive to the request of the public communications device, determining a geographic location of the public communications device, transmitting a map display in the website, the map display includes an identifier of the charity communications device, receiving a money donation related to the identifier, from the public communications device, and saving a credit in amount of the donation in the virtual account.

Yet another embodiment of the invention is a device for electronically selling and liquidating products for charitable gift giving. The device includes memory containing a set of instructions and a processor for processing the set of instructions wherein the set of instructions include instructions for receiving a request for a web site from a seller communications device, serving the website to the seller communications device, receiving via the website an offer from the seller communications device, creating a virtual account of credits for a charity communications device, receiving a purchase request from the charity communications device, the purchase request matches the offer, and transacting purchase by the charity communications device and sale by the seller communications device pursuant to the offer, in return for the credits of the virtual account.

Another embodiment of the invention is a device for electronically selling and liquidating products for charitable gift giving. The device includes memory containing a set of instructions and a processor for processing the set of instructions. The set of instructions include instructions for serving a website to a charity communication device, the website displays at least one product available for purchase by the charity communication device, establishing a virtual account for a charity communication device, crediting a donation received in respect of the charity communication device from at least one public device, accumulating the credit in the virtual account for purchase of any of the at least one product by the charity communication device, searching by the charity communication device for a select product of the at least one product, selecting the select product by the charity communication device in the web site, and transacting purchase of the select product with the credit, by the charity communication device in the web site.

BRIEF DESCRIPTION OF THE DRAWINGS

The present invention is illustrated by way of example and not limitation in the accompanying figures, in which like references indicate similar elements, and in which:

FIG. 5 illustrates an example display in a website of map image showing need location results, according to certain embodiments;

FIG. 6 illustrates an example taxonomy table for searching need units and available products and services, according to certain embodiments;

FIG. 10 illustrates an example display in a website of a crowd-funding portal for the promoting needs and available products or services, according to certain embodiments.

DETAILED DESCRIPTION

The following description refers to certain specific embodiments; however, the specific embodiments are merely illustrative and variations and changes may be made in the embodiments without diverting from the broad scope encompassed by the disclosure.

Figure 11:
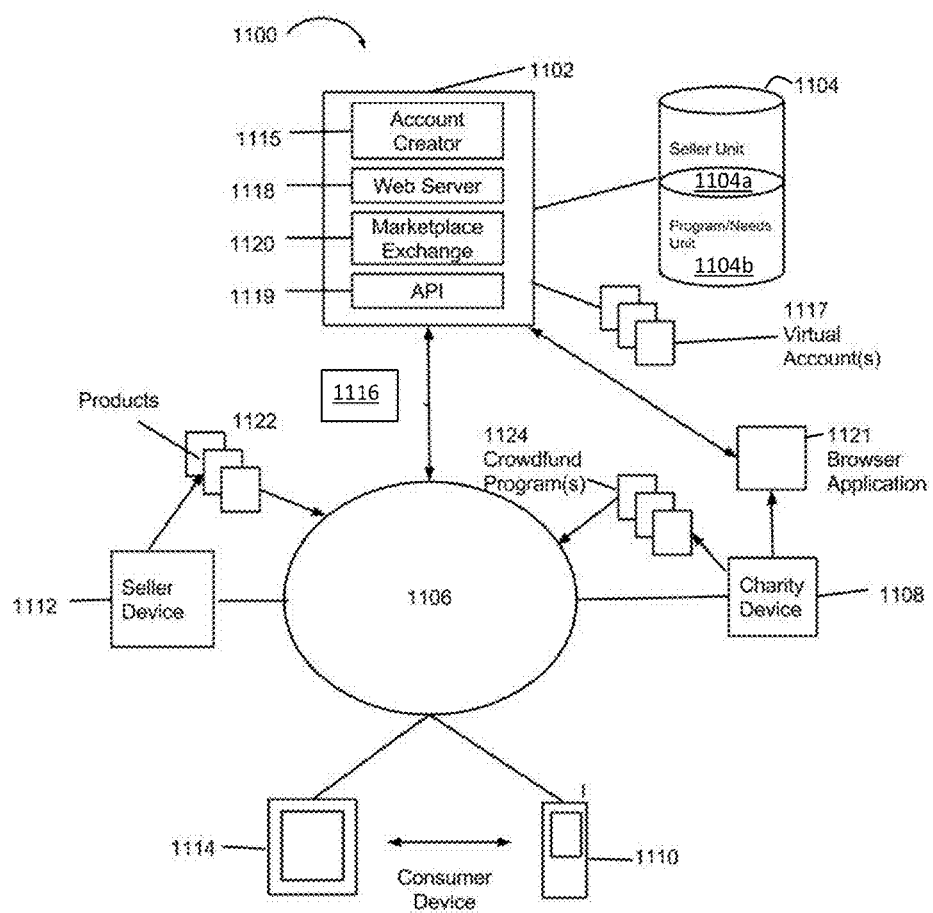
FIG. 11 illustrates a system for sale or liquidation of products or services by network connected devices, benefiting charity or philanthropy, according to certain embodiments.

Referring to FIG. 11, a system 1100 includes a server computer 1102 communicatively connected to a communications network 1106, such as a packet-switched network, for example, the Internet. As will be understood, the server computer 1102 may be one or more computing devices adapted for communicating over the network 1106. The server computer 1102 includes or is communicatively connected, for example, by wired or wireless connections or through one or more communication network, to one or more database 1104. The respective database(s) 1104, if not included in the server computer 1102, may, but need not necessarily, include redundancy/backup capabilities and may, but need not necessarily, be located in different geographic locations.

The database 1104, whether one or more database, includes at least a seller data store 1104a and a needs data store 1104b, which may be unitary or distinct. Each database 1104 stores various data and files representing devices and users of the devices in the system 1100, for example, profiles, sessions, and other access records and information. The seller data store 1104a further includes records of product and services units, for example, product or service name, product unique ID, promotional code, price, SKU, quantity, supplier or manufacturer name, and other identifiers of product and services units. The product and services units represent products and services which a seller device (as hereafter described) offers for sale at discount or promotion to charitable or philanthropic organizations or programs via the system 1100, and also represent the seller corresponding to the seller device in the system 1100. The needs data store 1104b also includes records of need units, for example, charitable or philanthropic organization name, program name, program unique ID, program description, associated geographic location identifier, needs requests (as hereafter described), and other identifiers of need units. The need units represent products or services which a charitable device (as hereafter described) seeks to purchase for charitable or philanthropic use via the system 1100, and also represent the charitable organization or philanthropic program corresponding to the charitable device in the system 1100.

The database 1104 is controlled by the server computer 1102. The server computer 1102 includes a website ("web") server 1118 for communicating a website 1116 via the communications network 1106, to requesting devices, for example, communications devices 1108, 1110, 1112, 1114, communicatively connected to the network 1106. The website 1116 is, for example, a computer program processed by a processor, such as a browser of the requesting device, for display of the website of one or more web pages in the browser. The web server 1118 is, for example, circuits, server program stored in memory and processed by a processor, or combinations, of the server computer 1102. An application programming interface (API) 1119 of the server computer 1102 is communicatively connected to the website 1116 for interactions with the website 1116 over the network 1106 by one or more communications devices 1108, 1110, 1112, 1114, for example. The API 1119 includes a query engine for lookup in the database 1104, as well as interactive results.

The server computer 1102 also includes an account creator 1115. The account creator 1115 creates one or more virtual accounts 1117 for accounting for money donations received from the communication (i.e., public) devices 1110, 1114 as hereafter described. The virtual accounts 1117 are related to the website 1116 and linked to the database 1104. Each virtual account 1117 represents a financial account corresponding to one or more record of the database 1104. Each virtual account 1117 is linked to at least one particular need unit record of the needs data store 1104b and may, but need not necessarily, also be linked to at least one particular product or service record of the seller data store 1104a. The virtual accounts 1117 are maintained in storage, for example, a locally connected, cloud, or third party storage, and may include or connect to PayPal™, Google™ Wallet, credit card, bank, or similar financial processor. In certain embodiments, the database 1104 may contain or include all or portion of the virtual accounts 1117.

The communications device 1108 (hereafter referred to as charitable device 1108) used in the system 1100 represents a charitable entity or philanthropic program in the system 1100. The communications device 1112 (hereafter referred to as seller device 1112) employed in the system 1100 represents a supplier or manufacturer of products or services offered to charitable entity or philanthropic program at a discounted price or other promotion in the system 1100. The communications devices 1110, 1114 (hereafter referred to as public device 1110 or 1114) used in the system 1100 represent respective general public donors in the system 1100.

The system 1100 includes at least one of the charitable device 1108 and at least one of the seller device 1112. Each charitable device 1108 is operated by a charitable or philanthropic program. The charitable device 1108 communicates with the web server 1118 over the network 1106 to display the website 1116. The charitable device 1108 may deliver via the API 1119 to the server computer 1102 through interaction with the website 1116, a need request 1124 representing a product or service sought by a charitable or philanthropic program. The need request 1124 may be, for example, a profile of the charitable or philanthropic program, together with name, geographic label or other identifier of desired product or service. The need request 1124 of the charitable device 1108 is stored by the server computer 1102 as a need units record in the needs data store 1104b of the database 1104.

Each seller device 1112 is operated by a seller or manufacturer desiring to sell or otherwise make available a product or service for charity or philanthropy, such as at a discount or special promotion, or other gift or benefit. The seller device 1112 communicates with the web server 1118 over the network 1106 to display the website 1116. The seller device 1112 may deliver via the API 1119 to the server computer 1102 through interaction with the website 1116, an offer 1122 representing a product or service available for purchase or acquisition to a charitable or philanthropic program. The offer 1122 may be, for example, a profile of the seller, together with seller name and product or service identifier. The offer 1122 of the seller device 1112 is stored by the server computer 1102 as a product and services units record in the seller data store 1104a of the database 1104.

The system 1100 also includes a marketplace exchange engine 1120. The marketplace exchange engine 1120 links to the virtual accounts 1117 and transacts via the website 1116 for monetary donations by public devices 1110, 1114 and the sale by the seller device 1112 and purchase by the charitable device 1108 of products and services. The marketplace exchange engine 1120 is, for example, circuits, program stored in memory and processed by a processor, or combinations, of the server computer 1102. The marketplace exchange engine 1120 is processed by the server computer 1102 responsive to receiving the need request 1124.

The need request 1124 is received by the server computer 1102 from any of the charitable device 1108, and stored in the needs data store 1104b. The account creator 1115 then creates a virtual account 1117 in respect of the charitable device 1108 and the need request 1124. The virtual account 1117 is linked to the database 1104 in relation to the need request 1124 and the charitable device 1108.

The system 1100 may also include one or more of the public device 1110, 1114 communicatively connected to the network 1106. The public device 1110 or 1114 may request access to the website 1116 by communications with the server computer 1102 over the communications network 1106. The server computer 1102 may permit access by the public device 1110 or 1114 to the website, or portion thereof.

For example, based on a geographic location entered by the public device 1110, or if applicable in certain embodiments, detected for the device 1110 by the server computer 1102, the public device 1110 may be permitted communicative access to a web page representing charitable and philanthropic entities and programs of the records of the needs data store 1104b corresponding to the geographic location of the public device 1110. The server computer 1102 can permissively limit the extent of the web page or any of the records, according to programming or configuration of the server computer 1102. The public device 1110 may interact with the web page, for example, by mouse click or other input, to further access additional web page(s) of the website 1116. In certain non-exclusive example, the public device 1110 is presented a web page representing a map with pinpoint identification of the charitable and philanthropy entities and programs of the database 1104 for the geographic location (e.g., charities in the geographic vicinity of the location of the public device 1110). Further in the example, the public device 1110 may click a select pinpoint to access further information of the website 1116 regarding the charity of the pinpoint. Alternately in the example, the public device 1110 may input a search query to the API 1119 to access web page(s) corresponding to different geographic location or specific select charity or philanthropic entity or program.

The website 1116 also permits the public device 1110 to interactively make a monetary donation to charitable or philanthropic entity or program corresponding to any of the need request 1124. Responsive to an indicator communicated by the public device 1110 via the API 1119 of the website 1116, the server computer 1102 via processing of the marketplace exchange unit 1120 may transact a donation related to the public device 1110 to particular one or more charitable or philanthropic entities or programs of the records of the needs data store 1104b. For example, a user of the public device 1110 can electronically transact via the marketplace exchange unit 1120 for a monetary donation to particular charity of any of the need request 1124. If the need request 1124 is for purchase of products or services of any of the offer 1122, the virtual account 1117 corresponding to the need request 1124 and offer 1122 is credited by the server computer 1102 in the amount of the donation. Monetary donations may also be made in respect of any need request 1124 that does not correspond to any of the offer 1122, and the virtual account 1117 corresponding to the need request 1124 is credited by the server in the amount of the donation. Records of donation transactions are stored in the database 1104.

The public device 1114 may similarly, for example, request access to the website 1116 by communications with the server computer 1102 over the communications network 1106, and the server computer 1102 may permit access by the public device 1114 to the website 1116, or portion thereof. For example, the public device 1114 may request via the API 1119 and be permitted communicative access to a sale sheet representing offers 1122 of products and services of the records of the seller data store 1104a. The server computer 1102 can permissively limit the extent of the sale sheet to represent particular ones of the records, according to programming or configuration of the server computer 1102. The sale sheet, for example, may correspond to a catalog (accessible by the charitable device 1108 as later described) of offers 1122 of products and services of the records of the seller data store 1104a, either as a set, subset, or superset thereof. In other instances, the sale sheet may include a catalog of particular products or services of offers 1122 corresponding to a particular need request 1124 of particular charitable or philanthropic entity or program of the needs data store 1104b. A user of the public device 1114 can electronically transact via the marketplace exchange unit 1120 to purchase for money particular products or services or to donate money as a portion of purchase price for particular products or services, for benefit of charitable or philanthropic entity or program. The amount of money transacted by the public device 1114 is credited by the server computer 1102 to the virtual account 1117 linked to the applicable needs request 1124 of the needs data store 1104b for the particular charity or philanthropy.

If the charitable device 1108 searches the database 1104 via the API 1119 to identify desirability of any of the offer 1122, the charitable device 1108 can purchase the product or service of the offer 1122 on the website 1116. The marketplace exchange engine 1120 transacts the purchase according to the offer 1122. The marketplace exchange engine 1120 may include, or communicatively connect to, a payment processor and a fulfillment processor. The server computer 1102 controls the database 1104 to record transactions of the marketplace exchange engine 1120. The payment processor processes money payments made for purchase of products and services, and the fulfillment processor processes logistics of supply of relevant products and services according to the payments.

The charitable device 1108 may apply monetary donations made by public devices 1110, 1114 for purchases of products or services offered in the system 1100 or accumulate credits in the system 1100. For example, the charitable device 1108 may purchase products or services of offers 1122 with monies of the virtual account 1117 of a corresponding need request 1124. In alternatives, the charitable device 1108 may purchase products or services of any of the offers 1122 (including those offers 1122 which may not directly correspond to match to need requests 1124). Further, the charitable device 1108 may accumulate and merge any or all credited amounts in virtual accounts 1117, for later transaction for purchase of products and services of offers 1122 in the system 1100.

In certain embodiments, pluralities of seller devices, such as the seller device 1112, can each offer respective products and services by communications with the server computer 1102 over the communications network 1106. Records of these offers and the representative products and services of the offers are stored in the seller data store 1104a of the database 1104. Responsive to communicated request over the network 1106 by the charitable device 1108 via the API 1119, the server computer 1102 processes the website 1116 to communicatively present a catalog of offered products and services in a display of the charitable device 1108. The charitable device 1108 may search the catalog and select for purchase the products and services. Purchase transactions for selected products and services are processed by the marketplace exchange engine 1120. Records of transactions are stored in the database 1104.

In certain embodiments, pluralities of charitable devices, such as the charitable device 1108, can each request products and services by communications with the server computer 1102 over the communications network 1106. Records of these requests and the representative products and services of the requests are stored in the needs data store 1104b of the database 1104. Responsive to communicated request over the network 1106 by the seller device 1112 via the API 1119, the server computer 1102 processes the website 1116 to communicatively present a list of requested products and services in a display of the seller device 1112. The seller device 1112 may search the list and select to offer the products and/or services. Sale transactions pursuant to offers are processed by the marketplace exchange engine 1120, and records of the transactions are stored in the database 1104.

In certain alternatives, the system 1100 includes a crowd-funding unit (not shown in FIG. 11). The crowd-funding unit is included in, or is communicatively connected to, the server computer 1102. The crowd-funding unit is, for example, a computer program stored in memory and processed by the server computer 1102. The crowd-funding unit operates or manages a crowd-funding network as a subset of the network 1106. In the crowd-funding network, certain devices 1110, 1114 are permitted access to the website 1116 for purposes of donating partial purchase price for products or services offered by the seller device 1112 for acquisition on behalf and for benefit of charitable device 1108. In the crowd-funding network, responsive to communicated request of the public device 1110 or 1114 over the crowd-funding network, the server computer processes the website 1116 to display in the public device 1110 or 1114, as applicable for the request, a list of needs requests designated for crowd-funds solicitation. The applicable public device 1110, 1114 can then donate any part of the purchase price for products or services to the crowd fund. The donation, together with donations of other public devices (e.g., public device 1110 and 114, and/or others), are accumulated in the virtual account 1117 corresponding to the need request 1124 and the charitable device 1108. The charitable device 1108 may via input to the website 1116 purchase products or services pursuant to an offer, with crowd fund amounts of the virtual account 1117, the purchase is transacted by the marketplace exchange unit 1120.

In certain alternatives, a look-up is performed in the database 1104 to determine any match (if any) of the need request 1124 to any of the offer 1122. If any match is found, the marketplace exchange engine 1120 returns the offer 1122 (or offers, as applicable) and the server computer 1102 communicates the offer 1122 to the charitable device 1108 via the website 1116. The display of the website 1116 in the charitable device 1108 lists the offer 1122 of the match. Similarly, when the offer 1122 is received by the server computer 1102, a look-up is performed in the database 1104 to determine any match (if any) of the offer 1122 to any of the need request 1124. If any match is found, the marketplace exchange engine 1120 returns the need request 1124 (or need requests, as applicable) and the server computer 1102 communicates the need request 1124 to the seller device 1112 via the website 1116.

In other certain alternatives, the crowd-funding unit of the website 1116 may link to a crowd fund portal of another website. A product or service supplier's website can include the crowd fund portal. The crowd fund portal may correspond to particular product or service of any of the offer 1122. The devices 1110, 1114 can input to the crowd fund portal of the supplier's website, and are directed to communication with the crowd-funding unit of the system 1100. Donations by the devices 1110, 1114 are registered by the server computer in the virtual account 1117 for the applicable need request 1124 and charitable device 1108 corresponding to the offer 1122. The charitable device 1108 may purchase product or services in the system 1100 using crowd fund amounts.

In other alternatives, the system 1100 is linked to a supplier or seller website. The supplier website may post offers of products or services for sale to charities at discount or promotion. Donations to charities for purchase of products or services may be made via the system 1100, in seamless manner through the supplier website linked to the system 1100. Further, purchase by charities of products or services posted to the supplier website may be made seamlessly via the system 1100, through the supplier website linked to the system 1100. An app (or similar application computer program) 1121 may be introduced into the supplier website to communicatively connect to the API 1119 or other communicative interface of the server computer 1102.

In operation, the seller devices post to the website offers of products and services for discounted or promotional pricing for charitable entities and philanthropic programs. The charitable devices may request products or services by post to the website, or may search the website for posts of seller devices. In response to request for products or services by a charitable device, any seller device can respond with an offer. The charitable devices may also search for posts of seller devices, in order to determine products and services offered by the seller devices. The charitable devices may purchase via the website the offered products and services for discounted or promotional pricing from respective seller devices. In addition to posting offers of products and services to the website, the seller devices may search for posted requests in the website of the charitable devices. The seller devices may offer via the website the requested products and services for purchase by the charitable devices.

Other devices, for example, public devices, may access the website and purchase products and services posted by seller devices and matching requests posted by charitable devices. The purchase is made by the public device in the website, for the benefit of a charitable entity or philanthropic program posting the request. Upon purchase by the public device, a confirmation of the purchase is delivered to the seller device, the public device and the charitable device associated with the transaction. Further, public devices may access the website and donate monies to particular charitable or philanthropic entity or program, or donate monies credited towards purchase price of offers matching need requests.

Crowd-funding of purchases can be transacted via the website. Charitable unit devices can create crowd-funding portals for soliciting contributions by public devices for purchase according to posted requests or offers for product and services. Public devices viewing posted requests may make donations of part payment(s) of purchase price of posted offers matching the posted requests. The partial payment(s) are aggregated in the system in the virtual account corresponding to the need request and/or charity or philanthropy. Upon accumulation of the purchase price, the charitable device may purchase product or services of offers through transaction by the marketplace exchange engine. Alternatively, the charitable device may accumulate amounts in the virtual account and make other or later purchases in the system. Confirmation of donations, and of purchases, are delivered to the charitable device, the seller device, and the relevant public device(s) of the payment(s).

In configurations in which the system 1100 is linked to a supplier or seller website, the supplier website may post items for sale to charity at promotion or discount. Donations may be effected by the system 1100 in seamless manner to the viewer of the supplier website. Similarly, purchases by charities of products or services posted to the supplier website may be transacted by the system 1100 in seamless manner to the viewer of the supplier website.

In certain alternatives, the system 1100 may collect information of donations and purchases transacted with donors and charities, respectively. The website 1116 may post information, or statistics, of such donations and purchases. The posted information may be selectively made accessible to public devices and charitable devices viewing the website 1116, as well as seller devices for viewing and to promote brand and reputation value among others using the system 1100. An app (or similar application computer program) included in a seller website may communicatively connect to the API 1119 or other communicative interface of the server computer 1102.

Figure 1:
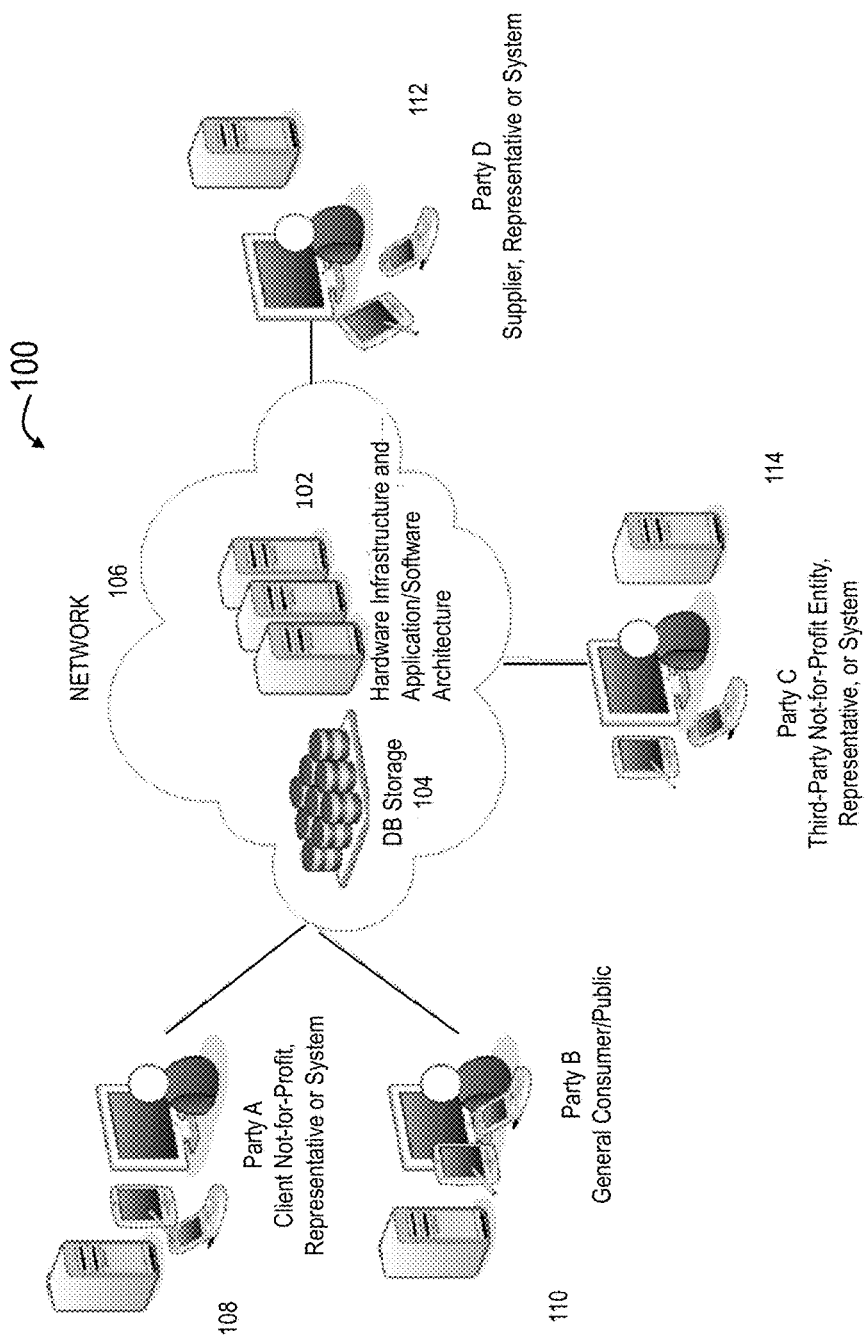
FIG. 1 illustrates a system for sale or liquidation of products or services via a communications network, according to certain embodiments.

Referring to FIG. 1, various communications devices 108, 110, 112, 114 (of users of the devices, i.e., Party A, B, C or D, respectively), for example purposes, any of a personal computer, and/or other communications devices, such as a laptop computer, workstation, personal data assistant ("PDA"), web-enabled phone, tablet device or other communications device (each shown in FIG. 1 for each of Party A, B, C and D), communicatively connect to a communications network 106. The communications devices 108, 110, 112, 114 each can communicatively connect to the server computer 102 via the communications network 106, for example, via an address of the network 106 (IP address or corresponding URL) or other network-identifier (calling number, text messaging number, or other) for the server computer 102, as applicable. The server computer 102 may include a website program stored in memory and processed by the server computer 102 to communicate a website for display. The communications devices 108, 110, 112, 114 may each include a browser for communicatively accessing the website of the server computer 102. An example of the communications network 106 is the Internet.

In operation, the communications device 114 enters the URL (or other address) for the server computer 102 in a browser of the device 114, and the server computer 102 communicates the website over the communications network 106 for display in the browser. Through the website, the device 114 communicates product or services file(s)

representing product or services available from a user (e.g., Party D) of the device 114, to the server computer 102 over the network 106. The server computer 102 stores records representing files received in one or more database 104 communicatively connected to the server computer 102. The files may include, for example and without limitation, identifiers of a product or service, product promotional data associated with product SKUs or other data representing products and services and sellers and manufacturers of those products and services.

The communications device 108 (e.g., of the user Party A) enters the URL (or other address) for the server computer 102 in a browser of the device 108, and the server computer 102 communicates the website (which may be same or different website from that for the device 114) over the communications network 106 for display in the browser. Through the website, the device 108 communicates philanthropic program file(s) representing products or services sought for charitable and philanthropic programs, to the server computer 102 over the network 106. The server computer 102 stores records representing files received in the database 104. The philanthropic program files may include, for example and without limitation, organization name, philanthropic program name, philanthropic program unique ID, philanthropic program description, product or service SKUs associated with a specific philanthropic program, and other identifiers of needs and need units. The device 108 may further browse the website via the communications network 106 to display records of products or services associated with the device 114, and locate product SKU data entered by the device 114 and associate it with philanthropic programs and/or purchase via the website the products or services of the device 114 represented in the database 104.

Other communications devices 110, 112 (e.g., of the users Party B and Party C, respectively) can each enter the URL (or other address) for the server computer 102 in a corresponding browser of the device 110 or 112. In each case, the server computer 102 communicates the website (which may be same or different website from that for the device 108 or the device 114) over the communications network 106 to the device 110 or the device 112, as applicable. The received website is displayed in the corresponding browser of the device 110 or 112.

In the case of the device 110, as a nonexclusive example, it may deliver a search query to the server computer 102 via the website, such as a request for particular charitable or philanthropic entit(ies), status of such entity, and/or location for the entity or philanthropic program relevant to the entity, represented by philanthropic program file(s) in the database 104. The server computer 102 receives the search query and searches the database 104 for any match to philanthropic program files of the database 104. If any match is presented, the server computer 102 communicates via the website to the device 108 for display of a list of matches to the search query. If no match is presented, the server computer may (but need not necessarily) communicate via the website to the device 108 for display of an alternative list of related items to the search query (which related items are not necessarily matches, but have relation to the search query).

The device 112, in another nonexclusive example, may deliver a search query to the server computer 102 via the website, such as for product or service file(s) in the database 104 representing particular products or services or representing a seller or manufacturer of products or services. The server computer 102 receives the search query and searches the database 104 for any match to product or service files of the database 104. If any match is presented, the server computer 102 communicates via the website to the device 108 for display of a list of matches to the search query. If no match is presented, the server computer may (but need not necessarily) communicate via the website to the device 108 for display of an alternative list of related product or services or seller or manufacturer, as applicable.

In the case of each of the communications devices 110, 112, the device 110 or 112 may transact to purchase products or services for benefit of charitable or philanthropic program. For example, particular products or services files of the database 104 are associated with specific charitable and philanthropic program files of the database 104, by the device 108 and/or the device 114 in communications via the website or by the server computer 102 according to configuration. Additionally, products or services files of the database 104 may be associated with charitable and philanthropic program files of the database 104, by the device 110 or 112. In each case, the devices 110, 112 can transact purchase of products or services for benefit of charitable or philanthropic program, as represented in the list of matches or alternative list of related products or services.

In certain embodiments, the device 108 or 114, or the device 110 or 112, can create a crowd-funding campaign of the website via communications with the website. The website includes a web platform for collecting a pool of payments for purchase of products or services for benefit of charitable and philanthropic programs. The web platform operates through a portal for payment of partial purchase price amounts, which when aggregated to reach a full purchase price, transacts the purchase. The crowd-funding campaign may be created via the portal by the device 108, for example, to receive partial payments from devices 110, 112 (or others) associated with particular products or services or particular charitable or philanthropic program, and to transact purchase according to the full purchase price for products upon receipt of aggregate partial payments equaling the full purchase price.

In certain embodiments, the server computer 102 is linked to a supplier or seller website for transacting donations and purchases. The supplier website may post items for sale to charity at promotion or discount, via a link to the server computer 102. Donations may be received at the server computer 102 through the supplier website in seamless manner, appearing to the viewer of the supplier website as an application of the supplier website. Similarly, purchases by charities of products or services posted to the supplier website may be transacted by the server computer 102 in seamless manner to the viewer of the supplier website.

In certain alternatives, the server computer 102 may collect information of donations and purchases transacted with donors and charities, respectively. The website of the server computer 102 may post information, or statistics, of such donations and purchases, for example, as charts, graphs, values and other statistics and information. The posted information may be selectively made accessible to public devices and charitable devices viewing the website, as well as seller devices for viewing and to promote brand and reputation value among others using the system of the server computer 102. In this manner, the website of the server computer 102 displays real-time usage and pattern images and information. Because real-time information is displayed, sellers and band value may benefit from exposure to others and sellers can track such benefit and exposure. Similar postings may appear in supplier websites in communicative connection to the server computer 102, such as via an app of the supplier website communicatively connected to the API 1119.

Figure 2A:
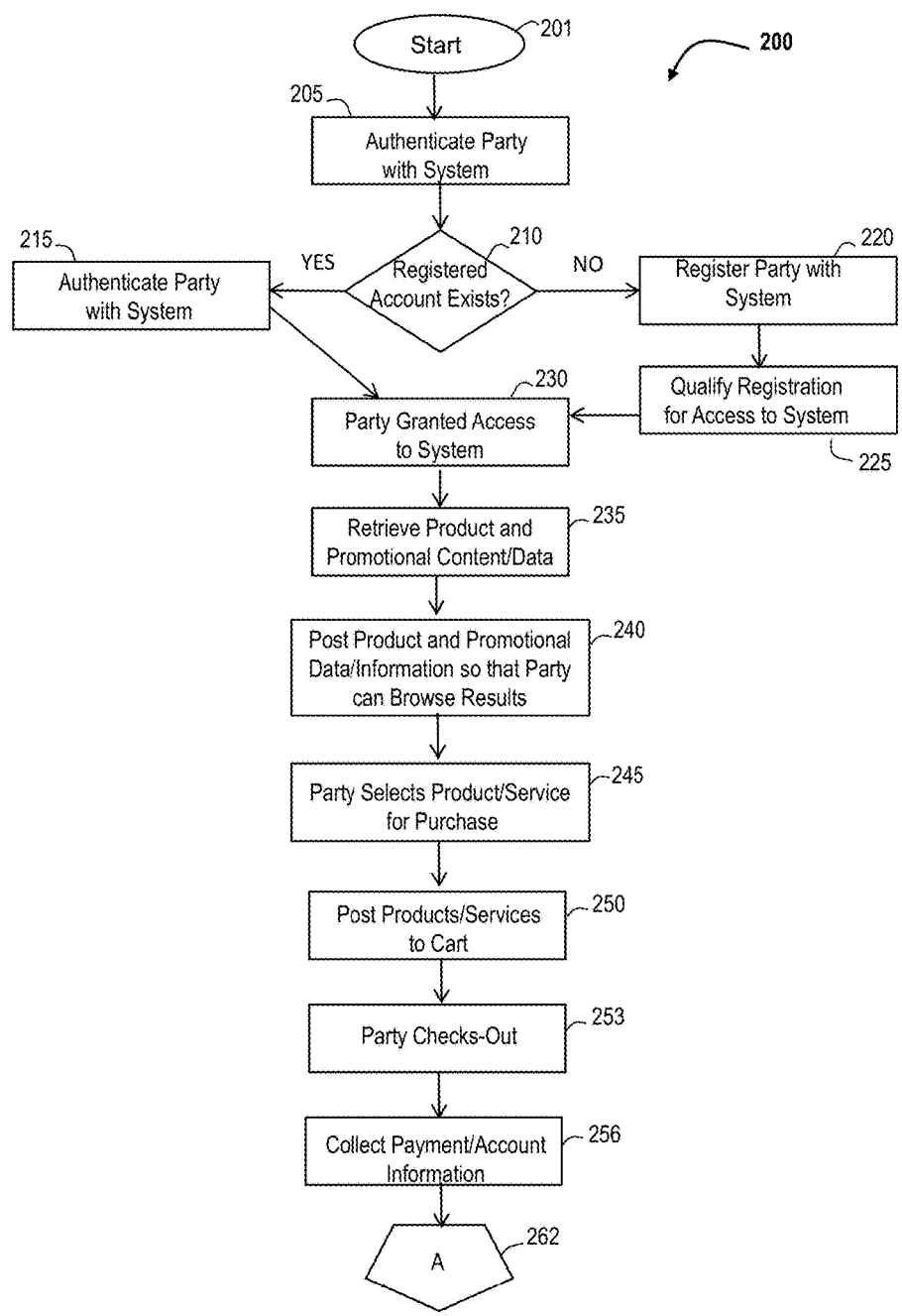
FIGS. 2A-B illustrates a method of selling or liquidating products or services for charity via communication devices of a communications network, according to certain embodiments.
Figure 2B:
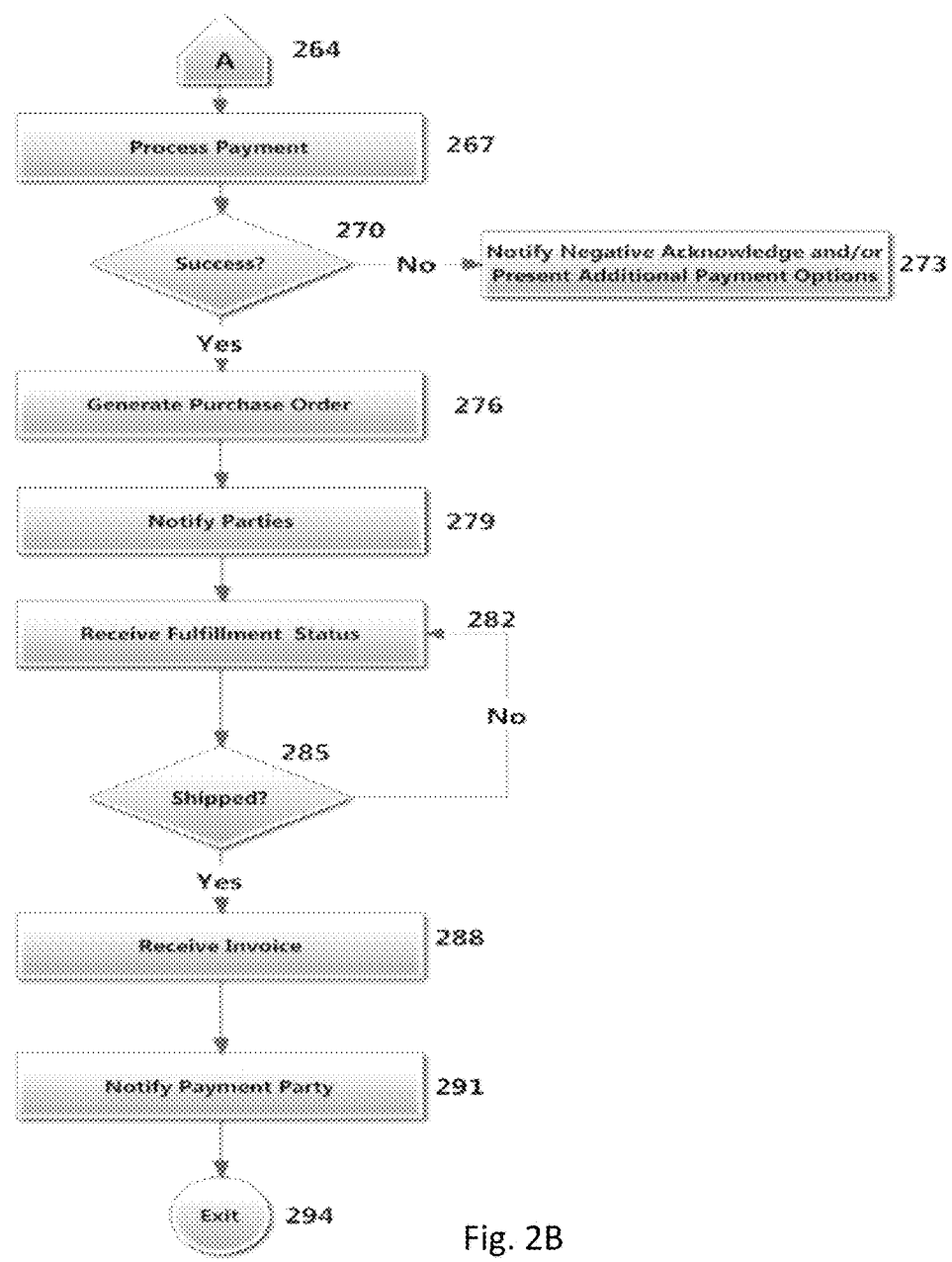

Referring to FIGS. 2A-2B, in conjunction with FIG. 1, a method, such as may be performed by the system 100 of FIG. 1, includes a step 201 of delivering by the server computer 102 a registration form to the browser of the device 110 over the communications network 106. The server computer 102 receives a file over the communications network 106 if the registration form is completed by input of the device 110 and sent to the server computer 102 over the communications network 106. The file received represents the completed registration form.

On receiving the file, data of the file representing the completed registration form is authenticated 205 by the server computer 102. In the step of authenticating 205, the server computer checks 210 in the database 104 to see if a record representing a registered account then exists or not. If no record of a registered account then exists in the database 104, the server computer 102 controls the database 104 in a step 220 to create a record of the completed registration form for the device 110.

If the step 210 determines that a record of the completed registration form then exists for the device 110, or if after the step 220, the server computer 102 in a step 215 or 225 communicates over the communications network 106 to the device 110 a request for authentication, for example, a page of the website requesting input by the device 110 of a user name, a password, password reminder question and answer, banking/credit account information, federal filing status, or EIN, or requesting acceptance of certain terms and conditions, or otherwise requesting other contact and identity validation information. In certain embodiments, during registration the device 110 can elect to receive alerts on specific products and/or services and/or categories of interest.

If the server computer 102 receives an appropriate response from the step 215 or 225, the server computer 102 communicates over the network 106 a menu page granting access 230 to the device 110. The menu page received by the device 110 displays in the browser various options for selection by input of the device 110, for example, account setup, user management, product and/or service categories/catalog.

After the step 230, the device 110 can, via input to the device 110, browse and/or search in the browser available products and/or services of interest as communicated in the step 235 in the website by the server computer 102. In response to the browse and/or search, the server computer 102 communicates one or more additional page of available product or service to the browser. For example, the page may display in the browser a product or service of a supplier brand name (e.g., a product or service of the supplier user of the device 114, i.e., Party D), together with the standard retail price of the item and the discount or promotion provided by the supplier for a not-for-profit entity or program (e.g., the non-profit Party A user of the device 108). The difference between the standard retail price and the discount or promotion provided by the supplier is one example of the pricing made available to registrants using the system 100. As herein described, the device 112 may choose to purchase products or services for the discounted or promotional pricing. Because the product or service is sold by the user of the device 114 for benefit of the user of the device 108 in the system 100, brand and price value can be preserved for the supplier, manufacturer or other user of the device 114.

Continuing in a step 240, the server computer 102 posts product and promotional data to the browser of the computer 108. The computer 108 selects products or services for purchase via the website in a step 245. In a step 250, the server computer 102 posts the products or services data to a holding area of the website named a cart for the purposes of this description. In a step 253, the server computer 102 presents options for payment to the device 108 including but not limited to PayPal, Google checkout, electronic funds transfer or credit card transaction. In a step 256, the device 108 selects a payment option and provides account access information to the server computer 102 via the browser. In a step 267, the server computer 102 transmits payment information to the payment gateway/provider and receives an acknowledgement in a step 270 and/or negative acknowledgment in a step 273.

If the step 270 indicates the payment is not successful, the server computer 102 communicates a notification to the device 110 in a step 273. The server computer 102, in a step 276, then creates a purchase order file in a step 276 and communicates the purchase order and/or receipt file to the device 110 and to the beneficiary, the device 108 (i.e., of user Party A), and adds record to the databases 104. In a step 279, the server computer 102 notifies the device 108 of successful purchase. In a step 282, the server computer 102 receives updates from the device 114 regarding the status of fulfillment of product or service. If a step 285 indicates that the service or product was fulfilled, the server computer 102 in a step 288 generates and transmits an invoice or receipt, and stores the invoice or receipt in the database 104. In a step 291, the server computer 102 notifies the device 108 and the device 114 of successful fulfillment.

Figure 3A:
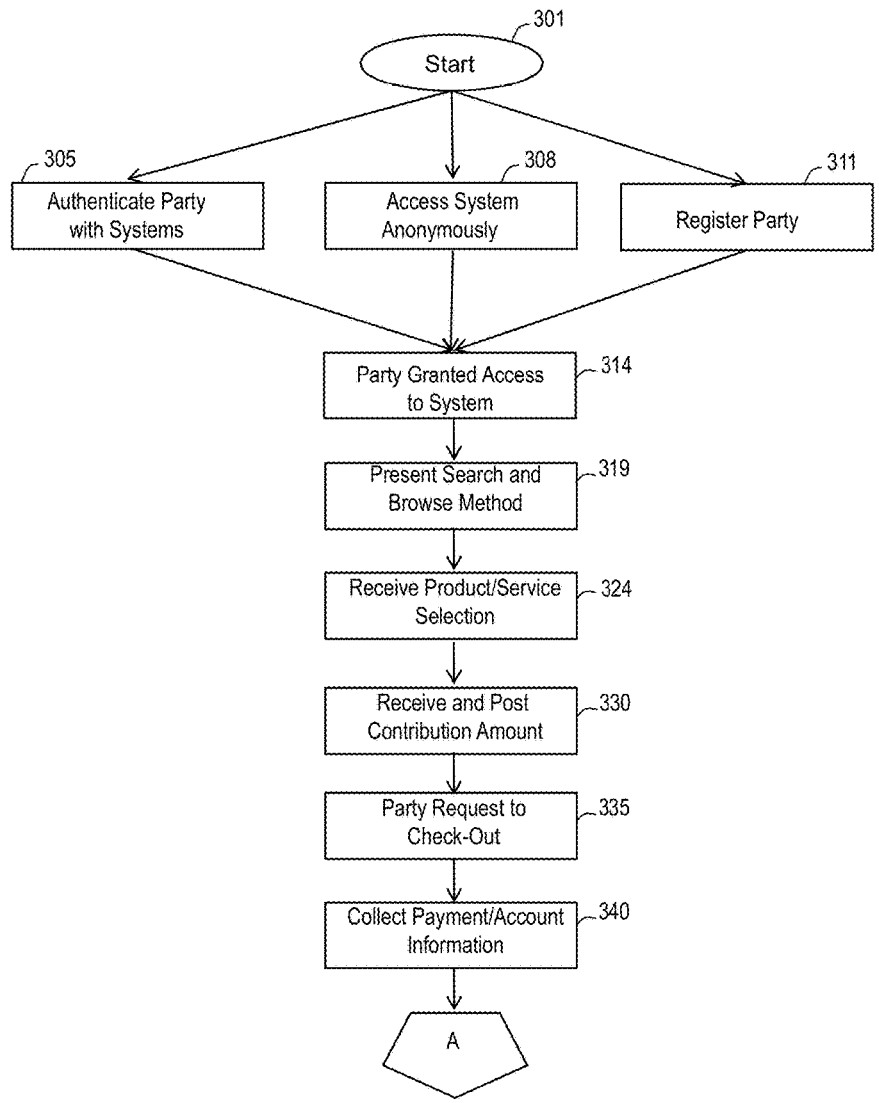
FIGS. 3A-B illustrates a method of purchasing products or services for charity via communication devices of a communications network, according to certain embodiments.
Figure 3B:
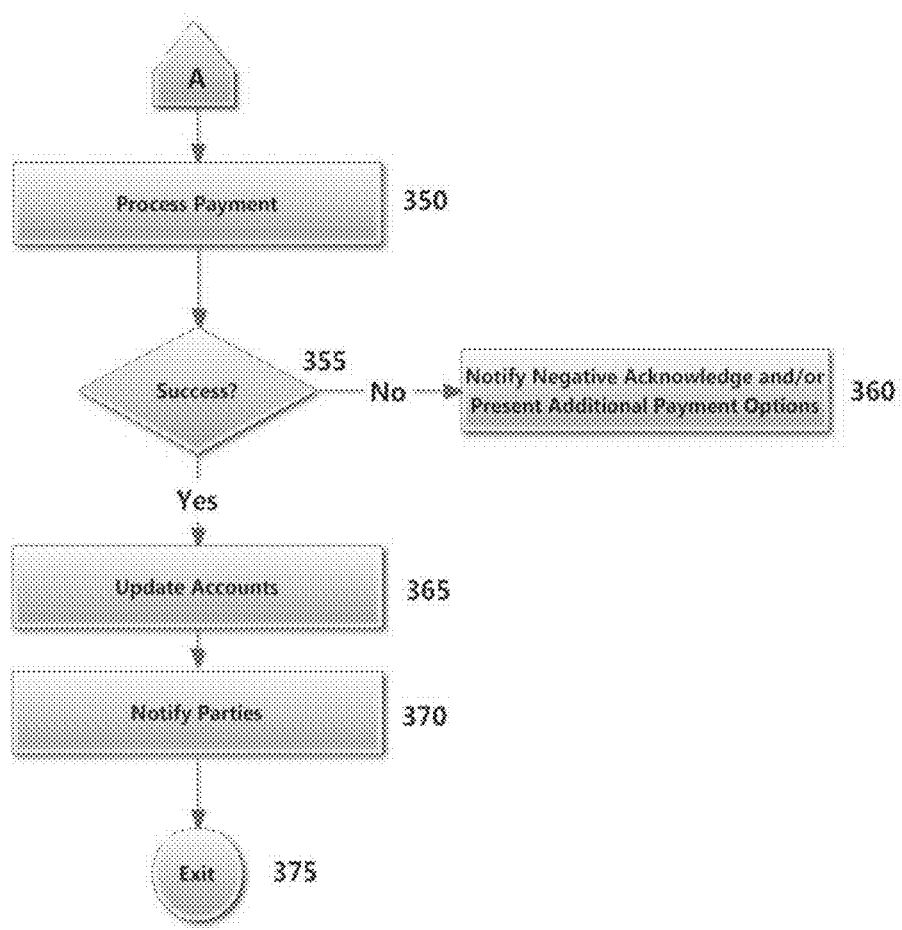

Referring to FIGS. 3A-B, a method 300, such as may be performed by the system 100 of FIG. 1, includes a step 301 of delivering by the server computer 102 a registration form to the browser of the device 110 (or 112) over the communications network 106. The party could be a general consumer device 110 or another system or entity. The server computer 102 receives a file over the communications network 106 if the registration form is completed by input of the device 110 and sent to the server computer 102 over the communications network 106. The file received represents the completed registration form.

On receiving the file, data of the file representing the completed registration form is authenticated 305 by the server computer 102. In the step of authenticating 305, the server computer 102 checks in the database 104 to determine if a record representing a registered account then exists. If a record of a registered account exists, then the server computer 102 authenticates the device 110. If no record of a registered account exists in the database 104, the server computer 102 prompts the device 110 to complete registration 311 or allows the device 110 to access the system anonymously without registering 308. For example, in the step 311, a page of the website is communicated by the server computer 102 to and displayed by the device 110 requesting input by the device 110 of a user name, a password, password reminder question and answer or to accept certain terms and conditions for the party, or otherwise. Other typical contact information and identity validation information may also be requested or required. In certain embodiments, during registration the device 110 can elect to receive alerts on categories of interest.

If the server computer 102 receives an appropriate response from the device 110 in the step 308 or 311, as applicable, or successfully authenticates the device 110 in the step 305, the server computer 102 communicates over the network 106 a menu page of the website, granting access 314 to the device 110. The menu page received by the device 110 displays in the browser various options for selection by input to the device 110, for example, account setup, search and browse, profile, notification preferences, favorites, communicatively received by the server computer 102.

In a step 319, after being granted access, the server computer 102 communicates to the device 110 a search and/or browsing option web page (described further below with respect to FIG. 4). On receiving input of an applicable search query entered by the device 110, the server computer 102 in a step 324 communicatively receives the search query to the web page and searches the database 104 for records corresponding to the search query. The server computer 102 communicates the results of the database 104 search in form of a web page list of products or services for purchase for benefit of a charitable or philanthropic entity or program. In response to the browse and/or search via the search query, the server computer 102, for example, communicates one or more web page list of available product or service to the browser of the device 110. For example, the page may display in the browser a product or service of a supplier brand name (e.g., user Party D of the device 114), together with the standard retail price of the item and the discount or promotion provided by the supplier for another party, for example, the device 108 (e.g., of user Party A) which is operated by or for a not-for-profit organization. The difference between the standard retail price and the discount or promotion provided by the supplier is one example of the pricing made available to registrants using the system 100. Because the product or service is sold by the device 114 (Party D) for benefit of the device 108 (Party A) in the system 100, brand and price value can be preserved for the device 114.

If the device 110 selects via input to the web page list any product or service, the server computer 102 in a step 330 posts the products or services data to a holding area of the website named a cart for the purposes of this description. The device 110 may then request to "check out" by input to the website communicatively received by the server computer 102 in a step 335. In a step 340, the server computer 102 communicatively presents a web page of the website to the device 110 for transacting payment by the device 110 corresponding to the product or service selections of the cart, including but not limited to PayPal, Google checkout, electronic funds transfer or credit card. If the server computer 102 communicatively receives a payment from the device 110 according to option for payment selected by the device 110 by input to the website, the server computer 102 in the step 340 transacts and collects payment and communicatively notifies the device 110, the device 114 of an applicable seller or manufacturer of product or service purchased, and the device 108 of an applicable charitable or philanthropic program for which the product or service was purchase, that the purchase was transacted.

Figure 4:
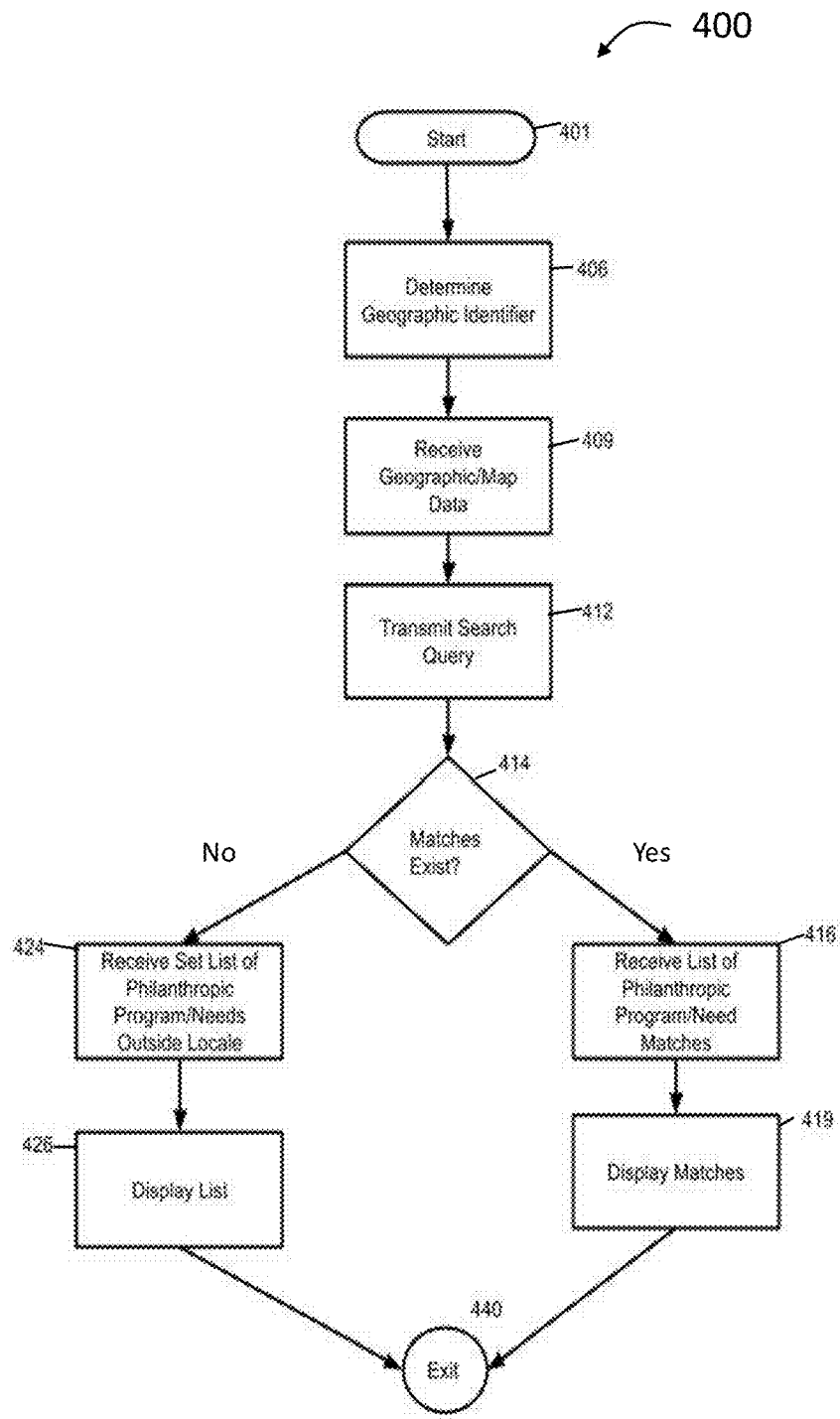
FIG. 4 illustrates a method of operation of a server computer for liquidating products or services via a communications network, according to certain embodiments.

Referring to FIG. 4, a method 400 of searching philanthropic programs in a website of a server computer and communicated by the server computer over a communications network includes a step 401, responsive to request of the server computer 102 to the device 110, of delivering to the server computer 102 a completed registration form from the browser of the device 110. The device 110 could be a general consumer device 110 or another system or entity. The server computer 102 receives the registration form over the communications network 106 if the registration form is completed by input of the device 110.

In a step 406, attempt is made by the server computer 102 to determine a geographical identifier for the device 110, such as based on internet protocol (IP) address and/or other device location discovery, such as but not limited to Global Positioning System (GPS). If determination of the geographical identifier for the device 110 is unsuccessful, the device 110 is requested by the server computer 102 to input corresponding geographical location, such as by input of a zip/geographic region name or code, communicated to the server computer 102. Further, the device 110 may elect to input a different location from that determined by the server computer 102 in the step 401.

Referring to FIG. 5, in conjunction with FIG. 4, on success of determination of the geographical identifier in the step 406, the device 110 receives from the server computer 102 a map image (graphic display) 500 in a step 409. The device 110 displays the map image 500 in the step. The map image 500 is focused on the particular geographical location of the device 110, as determined in the step 401. The map image 500 displays a random assortment of identifiers of need units and/or philanthropic programs of the records of the database 104 corresponding to the locale of the geographical identifier of the device 110.

In a step 412, the server computer 102 receives a search query input to the browser of the device 110, for example, a click on an identifier of need units and/or philanthropic programs in the map image 500, click on a menu item, or other search query input to the browser of the device 110. Other search queries may include, but are not exclusively limited to, charitable or philanthropic entity type or life state/situation of need of entit(ies) as represented in the records of the database 104.

Referring to FIG. 6, in conjunction with FIGS. 4 and 5, a non-exclusive example of a taxonomy table 600 illustrates possible life states/situations 604 of charitable and philanthropic programs 602 in geographic vicinity 606, as contained in the database 104.

The method 400 continues in a step 414 of matching results. In the step 414, the device 110 inputs (via click to the map image 500 or menu, query, or other) a selection of particular life state/situation 604, charitable/philanthropic program 602 and/or geographic vicinity 606. Based on input of the device 110, the browser of the device 110 communicates to the server computer 102 and the server computer 102 processes the input to determine any match(es) to records of the database 104. In a step 416, the device 110 communicatively receives from the server computer 102 representation of any match(es). The browser of the device 110 displays matched representations in a step 419. If no match is found in the database 104 by the server computer 110, the server computer 102 in a step 424 communicatively returns a pre-configured set (according to programming and configuration of the server computer 102) of philanthropic programs of the records of the database 104, which pre-configured set is found in different zip code or region from that of the request. The device 110 in the step 424 receives the communication and displays a representation of the pre-configured set in the browser of the device 110.

For example, the server computer 102 receives input of the device 110 targeted to particular zip code/geographic region. The server computer 102 then processes the database 104 to fetch any matching records of the database 104 identifying the targeted zip code/geographic region. The server computer then checks to see if a match exists. If it does not, then the server computer sends for receipt by the browser of the device a set of matches outside the immediate zip code or region. If there is a match, the server computer returns communication to the browser of the device for display of philanthropic programs in the requested zip code or region. Results may look similar to the example pins shown in FIG. 5, which represent specific philanthropic programs that match the search criteria as displayed in the browser. In the example, a number on each pin represents the number of needs or need units corresponding to the particular not-for-profit entity device identified by records of the database for the not-for-profit entity device. For each philanthropic program, for example, the method provides display in the browser of the device 110 of results with detailed information regarding the program, and the device 110 via input may view and interact with the displayed information.

Referring back to FIG. 5, a graphic display 500, such as may be viewable by a communications device, such as the device 110, accessing the server computer 102 via the communications network 106 includes an interactive map of locations and other identifiers of philanthropic programs that correspond to a searched selection criteria of the website. For example, the device 110, on accessing the website over the communications network 106 from the server computer 102, inputs to a search page of the website the criteria. The server computer 102, in conjunction with the databases 104, creates a website page containing a file displayable in the browser of the device 110 as a map in the website page. The map, as displayed in the browser, includes one or more flag/markers representing a philanthropic program in a location that matches the specified criteria. The map also includes numbers representing a specific number of products and/or services (i.e., needs or need units) that are needed for the particular philanthropic program.

Referring back to FIG. 6 a taxonomy table 600, such as may be presented in a search page of the website viewed in a display, for example, of the device 110, includes two pre-filled list boxes representing entity and life-state respectively, combined with a free-form entry field for data entry requesting location based data such as city, state, zip or GPS coordinates. In operation, the server computer 102 communicating with the device 110 over the communications network 106 delivers the table 600 from the database 104 to the device 110 for viewing in the search page of the website. The table 600 is interactive at the device 110, and through communications of the device 110 with the server computer 102 via the search page, highlight prompts appear in the table 600 requiring input from the device 110. For example, a life entity block 602 first appears in highlight. The device 110 must select an option in the pre-filled list in the life entity category X. A life state block 604 then appears highlight. The device 110 must select an option in the pre-filled list in the life-state category Y. Finally the device 110, or in certain alternatives, the server computer 102 via a network address or the like of the device 110, enters a geographical location, represented by Column Z.

As an example of the table 600 and input to the table 600 by the device 110, the device 110, or in certain alternatives, the server computer 102, such as via network address detection, inputs a particular product or service identifier representing a donation to a family dealing with homelessness in the 78751 zip code. In another example, the device 110, or the server computer 102, as applicable, can input a particular product or service identifier representing a donation for a farmer dealing with a drought in Texas. The foregoing examples are non-exclusive.

Figure 7:
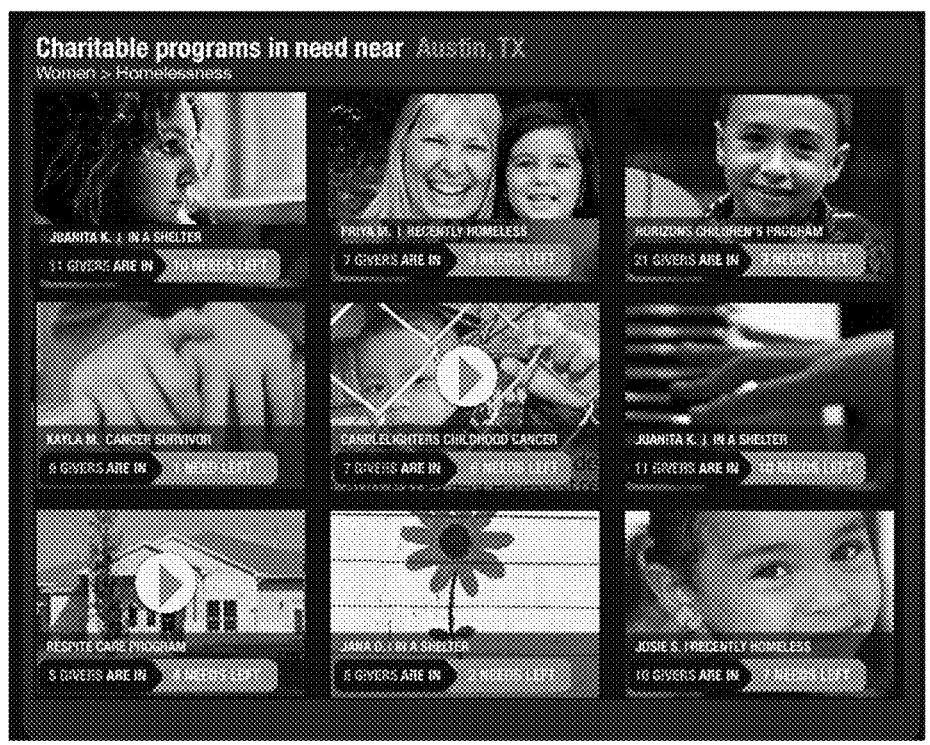
FIG. 7 illustrates an example display in a website hosting a charitable marketplace exchange, showing need units results from a search, according to certain embodiments.

Referring to FIG. 7 a programs display 700 showing the results of a search, for example, according to the method 500 of FIG. 5, may be delivered to and viewable by a communications device, such as the device 110, accessing the server computer 102 via the communications network 106. The programs display 700 includes descriptors of philanthropic programs resulting from search performed by the device 110. For example, the device 110, on accessing the website over the communications network 106 from the server computer 102, inputs to a search page of the website a query for particular philanthropic programs of the records of the database 104. The server computer 102, in conjunction with the databases 104, creates a website page containing a file displayable in the browser of the device 110 as a list of descriptors of the matching philanthropic programs and associated details. The programs and details may include, for example but not limitation, philanthropic program name, number of parties participating in contributing to the philanthropic program, location of philanthropic program, balance of the specific products or services needed by the philanthropic program, image and/or video associated with the philanthropic program.

Figure 8:
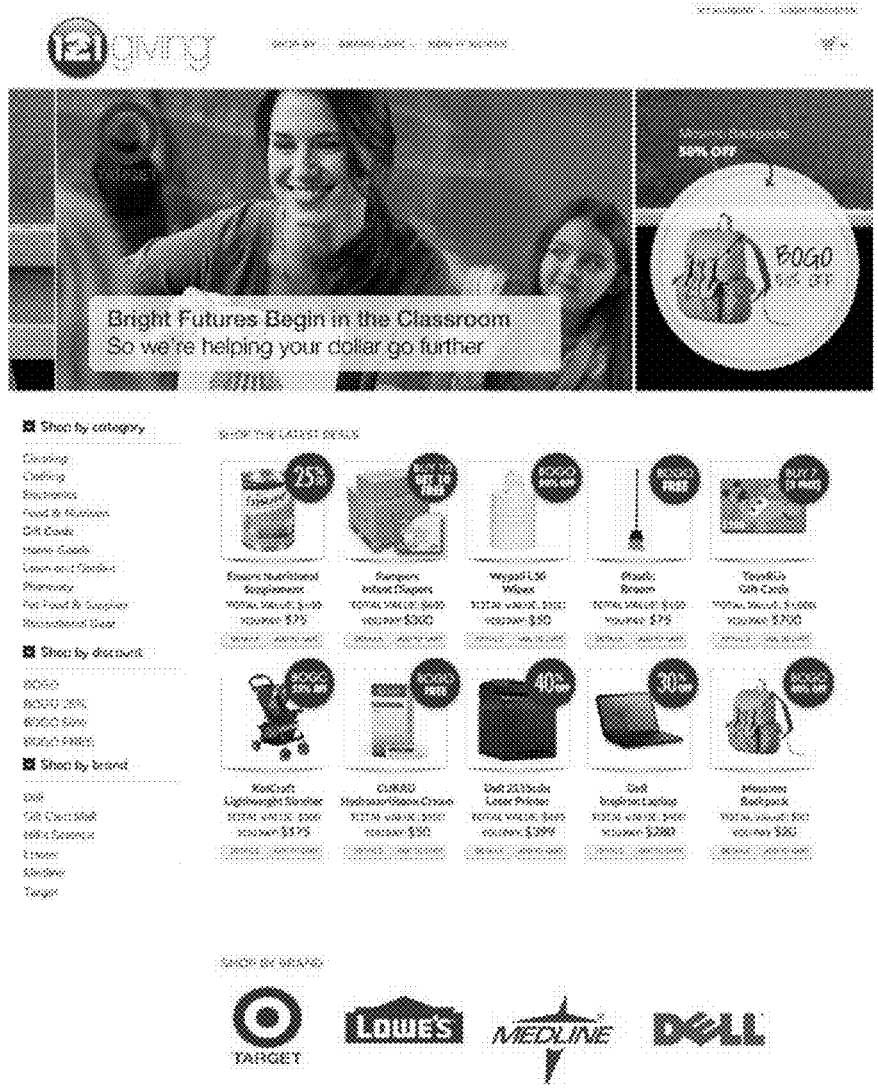
FIG. 8 illustrates an example display in a website hosting a charitable marketplace exchange, showing seller units results from a search, according to certain embodiments.

Referring to FIG. 8 a products display 800 showing the results of a search, for example, according to the method 200 of FIGS. 2A-B, may be delivered to a communications device, such as the device 108, and displayed. The products display includes identifiers representing product deals presented in the records of the database 104. For example, the device 108, on accessing the website over the communications network 106 from the server computer 102, inputs to a search page of the website a query for particular products available for purchase of the records of the database 104. The server computer 102, in conjunction with the databases 104, creates a website page displayable in the browser of the device 108 as a list of the services or products 802 offered for sale and matching the query. The products and services for sale are labeled with offers and promotions that create a hybrid sale and donation package, as in Buy X Get X donated, where X represents a variable quantity, unit or amount of product or service. Additional offers provide flat percentage based discount on products and/or services, or others. The products display 800 may serve as a so-called "omni channel" of a collection of varied products available from a variety of sellers.

Figure 9:
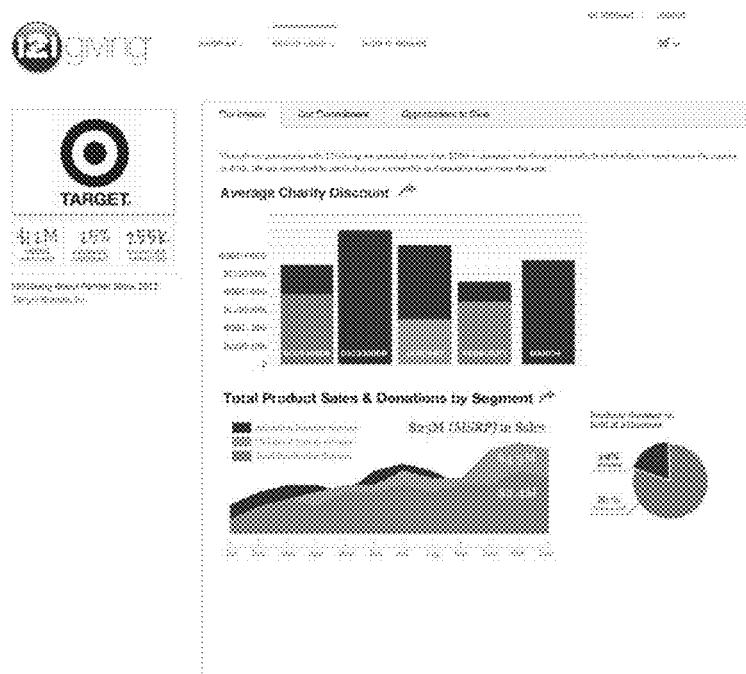
FIG. 9 illustrates an example display in a website of transactional commerce statistics for products and services sold by a supplier device for charitable gift, according to certain embodiments.

Referring to FIG. 9 a metrics display viewable by a communications device, such as the device 108, 110, 112, or 114 accessing the server computer 102 via the communications network 106, includes graphs illustrating aggregated metrics and statistics of discounts and sales/donations of the records of the database 104.

Referring to FIG. 10, a crowd fund page 1000 viewable by a communications device, such as the device 108, accessing the server computer 102 via the communications network 106, includes an interactive window 1002 for initiating a crowd funding program for a specified product. Via the interactive window 1002, the device 108 chooses by input to message partner/constituent device(s) over the communications network 106. For example, the device 108, via interactive input to the window 1002, requests the server computer 102 to send the message to partner/constituent devices communicatively connected to the network 106.

In the foregoing, the invention has been described with reference to specific embodiments. One of ordinary skill in the art will appreciate, however, that various modifications, substitutions, deletions, and additions can be made without departing from the scope of the invention. Accordingly, the specification and figures are to be regarded in an illustrative rather than a restrictive sense, and all such modifications, substitutions, deletions, and additions are intended to be included within the scope of the invention. Any benefits, advantages, or solutions to problems that may have been described above with regard to specific embodiments, as well as device(s), connection(s), step(s) and element(s) that may cause any benefit, advantage, or solution to occur or become more pronounced, are not to be construed as a critical, required, or essential feature or element.

What is claimed is:

1. A method, comprising:

providing a web server computer communicatively connected to a telecommunications network;

providing a website of the web server computer;

receiving by the website an offer from a seller communications device communicatively connected to the telecommunications network;

receiving by the website a need request from a charity communications device communicatively connected to the telecommunications network, the charity communication device is related to a particular geographic locale;

providing a database communicatively connected to the server computer and the website, the database structured to relate the offer to the particular geographic locale;

providing an account creator communicatively connected to the server computer and the database;

creating a virtual account by the account creator for the need request;

matching by the account creator the need request to the offer in the virtual account;

storing by the account creator the virtual account in the database;

receiving by the server computer a request for the website, from a public communications device communicatively connected to the server computer over the telecommunications network;

determining by the server computer a geographic location of the public communications device via a network address of the public communications device of the telecommunications network;

transmitting by the server computer the website to the public communications device over the telecommunications network;

determining by the server computer proximity of the particular geographic locale of the charity communications device to the geographic location of the public communications device;

transmitting by the server computer to the public communications device over the telecommunications network, a map display in the website, the map display in the website includes an identifier of the charity communications device;

receiving by the server computer from the public communications device over the telecommunications network, an input selecting the identifier by the public communications device;

transmitting by the server computer to the public communications device over the telecommunications network a sale sheet representing the offer and the need request;

providing a marketplace exchange unit communicatively connected to the server computer;

receiving by the server computer from the public communications device over the telecommunications network, a donation related to the sale sheet;

storing by the account creator in the database credits of the donation relative to the need request and offer of the sale sheet;

linking the server computer to a supplier website so that donations may be received by the server computer through the supplier website in a seamless manner, thereby appearing to a user of the supplier website as an application of the supplier website;

receiving by the server computer from the charity communications device over the telecommunications network from the supplier website, a purchase request relative to the need request and the offer;

transacting via the marketplace exchange unit a purchase by the charity communications device from the seller communications device via credits in respect of the donation and the offer.

2. A method, comprising:

providing a server computer communicatively connected to a telecommunications network;

providing a website of the web server computer;

providing a database communicatively connected to the server computer;

providing an account creator communicatively connected to the server computer and the database;

receiving by the server computer via the website over the telecommunications network from a charity communication device a profile and a product request, the profile includes a particular geographic locale;

creating by the account creator in the database a virtual account for the charity communication device for the profile and the product request;

receiving by the server computer via the website from a public device communicatively connected to the telecommunications network, a request for access to the website;

transmitting the website by the server computer to the public device;

receiving by the server computer via the website over the telecommunications network from the public device a public profile;

creating by the account creator in the database a public account for the public device;

determining by the server computer a geographic location of the public device via a network address of the public device of the telecommunications network;

storing the geographic location in the database relative to the public account;

determining by the server computer that the particular geographic locale is within proximity to the geographic location;

transmitting by the server computer to the public device over the telecommunications network a map for display in the website, the map includes an identifier of the charity communication device;

receiving by the server computer from the public device over the telecommunications network an input selection of the identifier to the website;

transmitting by the server computer to the public device over the telecommunications network a sale sheet;

receiving by the server computer a donation from the public device via the telecommunications network, the donation is related to the charity communications device;

crediting the donation received in respect of the charity communication device from the public device to the virtual account;

transmitting by the server computer to the charity communication device over the telecommunications network a notification of the donation;

linking the server computer to a supplier website so that donations may be received by the server computer through the supplier website in a seamless manner, thereby appearing to a user of the supplier website as an application of the supplier website;

selecting by the charity communication device in the supplier website via the telecommunications network to the server computer, the donation for purchase pursuant to the product request; and transacting by the server computer via the credit of the donation to the virtual account, for purchase pursuant to the product request by the charity communication device.

3. The method of claim 2, further comprising:

receiving by the server computer a request for the website, from a seller communications device communicatively connected to the server computer by the telecommunications network;

serving the website by the server computer to the seller communications device over the telecommunications network;

receiving via the website by the server computer over the telecommunications network, an offer for sale from the seller communications device of the product of the product request; and transmitting by the server computer to the charity communication device over the telecommunications network via the website, a sell sheet of the offer.

4. The method of claim 3, further comprising: crediting the virtual account with donations received from more than one public device communicatively connected to the server computer.

5. A device for electronically selling and liquidating products for charitable gift giving comprising:

(a) memory containing a set of instructions; and (b) a processor for processing the set of instructions wherein the set of instructions include instructions for:

providing a website communicatively connected to a telecommunications network;

receiving by the website an offer from a seller communications device communicatively connected to the telecommunications network;

receiving by the website a need request from a charity communications device communicatively connected to the telecommunications network, the charity communication device is related to a particular geographic locale;

saving by the website the offer and the particular geographic locale in a database communicatively connected to the website, the database structured to relate the offer to the particular geographic locale;

creating by the website a virtual account in the database for the need request;

matching by the website the need request to the offer in the virtual account;

storing by the website the virtual account in the database;

receiving by the processor a request for the website from a public communications device communicatively connected to the telecommunications network;

determining by the processor a geographic location of the public communications device via a network address of the public communications device of the telecommunications network;

transmitting by the processor the website to the public communications device over the telecommunications network;

determining by the processor proximity of the particular geographic locale of the charity communications device to the geographic location of the public communications device;

transmitting by the website to the public communications device over the telecommunications network, a map display, the map display includes an identifier of the charity communications device;

receiving by the website from the public communications device over the telecommunications network, an input selecting the identifier by the public communications device;

transmitting by the website to the public communications device over the telecommunications network a sale sheet representing the offer and the need request;

communicating by the website with a marketplace exchange unit communicatively connected to the website;

receiving by the website from the public communications device over the telecommunications network, a donation related to the sale sheet;

storing by the website in the database credits of the donation relative to the need request and offer of the sale sheet;

linking a server computer to a supplier website so that donations may be received by the server computer through the supplier website in a seamless manner, thereby appearing to a user of the supplier website as an application of the supplier website;

receiving by the supplier website from the charity communications device over the telecommunications network, a purchase request relative to the need request and the offer; and transacting via the marketplace exchange unit a purchase by the charity communications device from the seller communications device via credits in respect of the donation and the offer.

6. A device for electronically selling and liquidating products for charitable gift giving comprising:

(a) memory containing a set of instructions; and (b) a processor for processing the set of instructions wherein the set of instructions include instructions for:

providing a website communicatively connected to a telecommunications network;

providing a database communicatively connected to the website;

providing an account creator communicatively connected to the website and the database;

receiving by the website over the telecommunications network from a charity communication device a profile and a product request, the profile includes a particular geographic locale;

creating by the account creator in the database a virtual account for the charity communication device for the profile and the product request;

receiving by the website from a public device communicatively connected to the telecommunications network, a request for access to the website;

transmitting the website to the public device over the telecommunications network;

receiving by the website over the telecommunications network from the public device a public profile;

creating by the account creator in the database a public account for the public device;

determining by the processor a geographic location of the public device via a network address of the public device of the telecommunications network;

storing by the processor the geographic location in the database relative to the public account;

determining by the processor that the particular geographic locale is within proximity to the geographic location;

transmitting by the processor to the public device over the telecommunications network a map for display in the website, the map includes an identifier of the charity communication device;

receiving by the website from the public device over the telecommunications network an input selection of the identifier to the website;

transmitting by the website to the public device over the telecommunications network a sale sheet;

receiving by the website a donation from the public device via the telecommunications network, the donation is related to the charity communications device;

crediting the donation received in respect of the charity communication device from the public device to the virtual account;

transmitting by the website to the charity communication device over the telecommunications network a notification of the donation;

linking a server computer to a supplier website so that donations may be received by the server computer through the supplier website in a seamless manner, thereby appearing to a user of the supplier website as an application of the supplier website;

selecting by the charity communication device in the supplier website via the telecommunications network, the donation for purchase pursuant to the product request; and transacting by the processor via the credit of the donation to the virtual account, for purchase pursuant to the product request by the charity communication device.

7. The device of claim 6, wherein the set of instructions includes instructions for:

receiving by the processor over the telecommunications network, a request for the website from a seller communications device communicatively connected to the telecommunications network;

transmitting the website to the seller communications device over the telecommunications network; and receiving via the website an offer for sale from the seller communications device pursuant to the purchase request.

8. The device of claim 6, wherein the set of instructions includes instructions for: crediting by the processor in the memory the virtual account with donations received from more than one public device.

9. The device of claim 7, wherein the set of instructions includes instructions for: crediting by the processor in the memory the virtual account with donations received from more than one public device.

10. The device of claim 7, wherein the set of instructions includes instructions for:

creating by the account creator in the database a plurality of virtual accounts for a plurality of charity communications devices, responsive to respective input from respective ones of the plurality of charity communication devices received to the website over the telecommunications network; and crediting respective donations from respective ones of a plurality of the public devices, responsive to respective donations received to the website over the telecommunications network.

11. The device of claim 6, wherein the set of instructions includes instructions for:

requesting donations by the processor via another website over the telecommunications network; and crowd-funding donations received from any of the plurality of public devices, for credit to the virtual account.

12. The method of claim 1, further comprising:

repeating the steps for a plurality of the public communications devices; and receiving by the website from the public communications devices over the telecommunications network, money donations for credit to the virtual account;

wherein donations from a plurality of the public communications devices are aggregated by the server computer in the database, as credits in the virtual accounts, respectively, for a plurality of the charity communications devices, respectively.

13. The method of claim 1, further comprising: crowd-funding donations to the virtual account, of a plurality of public communications devices, via a crowd fund website of another server computer.

14. The method of claim 2, further comprising: repeating the steps for a plurality of virtual accounts, respectively, of a plurality of charity communication devices, respectively.

15. The method of claim 3, further comprising: repeating the steps for a plurality of seller communications devices.

16. The method of claim 3, further comprising: serving via the website by the server computer over the telecommunications network to the charity communications device, a statistic of the step selected from the group of: receiving the donation, transacting purchase with the credit, accumulating the credit in the virtual account, receiving via the website by the server computer the offer for sale, and combinations of these.

17. The device of claim 5, wherein the set of instructions includes instructions for: serving via the website by the server computer over the telecommunications network, a statistic of the step selected from the group consisting of: receiving the offer, transacting purchase by the charity communications device and sale by the seller communications device, receiving the donation, storing the credit, and combinations of these.

18. The device of claim 7, wherein the set of instructions includes instructions for: serving via the website by the server computer over the telecommunications network, a statistic of the step selected from the group consisting of: crediting the donation, transacting for purchase, receiving by the website the offer for sale, and combinations of these.

* * * * *